United States Patent Office 3,058,297
Patented Oct. 16, 1962

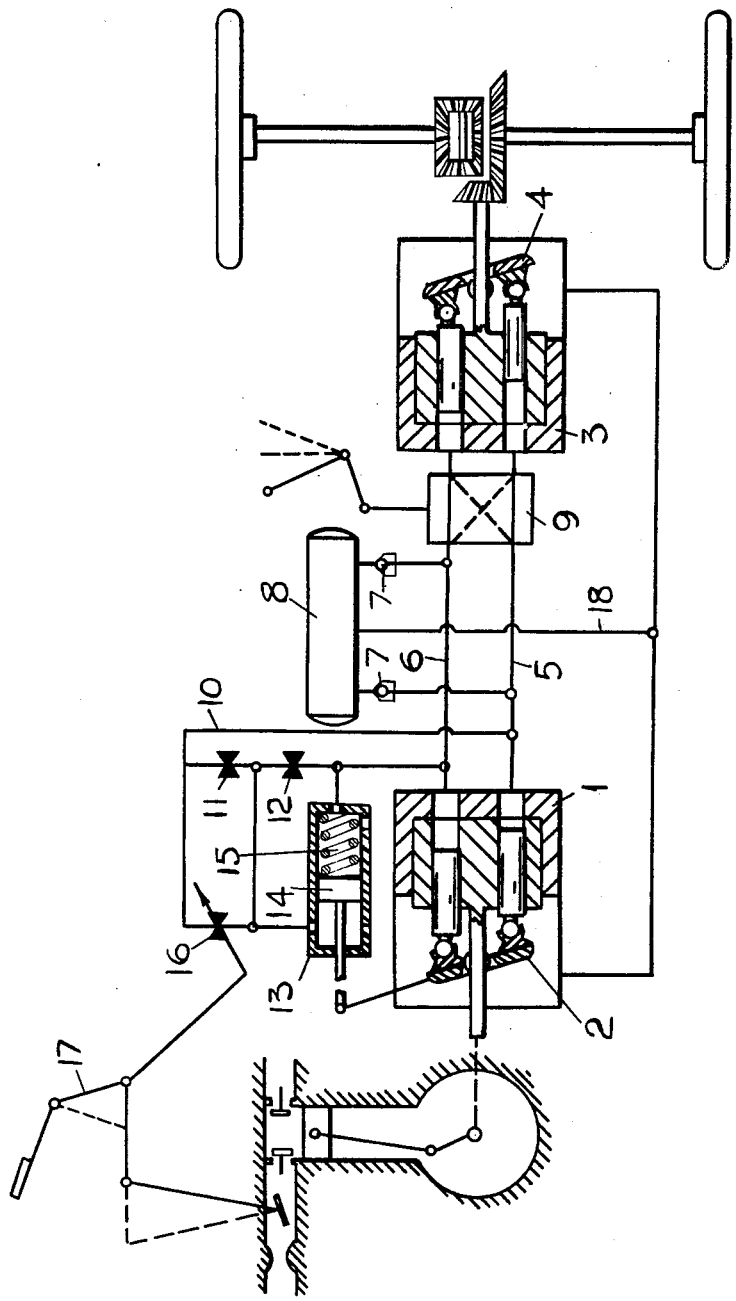

3,058,297
TRANSMISSION SYSTEM FOR USE IN A VEHICLE
Noel P. Tolley, Toronto, Ontario, Canada, assignor to Joseph Lucas (Industries) Limited, Birmingham, England
Filed Apr. 24, 1961, Ser. No. 105,098
Claims priority, application Great Britain Apr. 26, 1960
1 Claim. (Cl. 60—19)

This invention relates to vehicle transmission systems of the kind comprising an engine driven pump of the swash-plate type for supplying motive fluid to a fluid actuated motor for driving the vehicle, and servo-mechanism for varying the obliquity of the cam plate of the pump in accordance with the load on the motor.

The object of the invention is to provide such a system in a convenient form.

According to the invention a system of the kind specified comprises in combination a servo cylinder containing a piston which is connected to the cam plate of the pump, a spring acting on the piston in a direction to move the cam plate to a position of maximum obliquity, a pair of restricting orifices connected in series between the inlet and outlet of the pump, means connecting a point intermediate to the pair of orifices to one end of the servo-cylinder whereby a fluid pressure proportional to the delivery pressure of the pump is caused to oppose the action of said spring, and a valve bridging one of the orifices and arranged to be opened automatically as the engine throttle is closed, said valve, when opened, serving to cause said end of the cylinder to be subjected to a higher proportion of the output pressure of the pump.

An example of the invention is illustrated diagrammatically in the accompanying drawing.

Referring to the drawing, there is provided an engine driven pump 1 of the swash-plate type having an angularly adjustable cam plate 2. The pump is adapted to deliver motive fluid to a fluid actuated motor 3 which may also conveniently be of the swash plate type, but having a fixed cam plate 4. For this purpose, the outlet of the pump 1 is connected to the inlet of the motor 3 by a pipe 5, and the outlet of the motor is connected to the inlet of the pump by a pipe 6 to provide a closed hydraulic circuit which can be replenished against loss through non-return valves 7 from a reservoir 8. Moreover, in the pipes 5 and 6 is a manually operable valve 9 whereby the connections between the pump and the motor can be reversed to enable the pump to drive the motor in a reverse direction, or the inlet and outlet of the pump can be interconnected to provide a neutral position.

The inlet and outlet of the pump are interconnected through a passage 10 incorporating two restricting orifices 11, 12, in series, and a point intermediate the two orifices 11, 12 which will be at a pressure proportional to the delivery pressure which is in turn dependent on the load on the motor, is connected to the outer end of a servo cylinder 13. In the servo cylinder is a piston 14 which is connected to the cam plate 2 of the pump. The piston 14 is loaded in a direction to move the cam plate to a position of maximum obliquity by means of a coiled compression spring 15 interposed between the piston and the inner end of the cylinder 13. Moreover, the inner end of the cylinder is connected to the pump inlet.

The nature of the spring 15 is so chosen that the pump output will be reduced as the load on the motor increases and vice versa, so that when the engine is operating at a fixed intermediate setting the speed of the engine will vary according to the required torque. However, in parallel with the restricted orifice 11 is a passage incorporating a variable restricting orifice valve 16 which is linked to the engine throttle control 17 in such a manner that as the throttle is closed the orifice valve 16 opens. Thus, as a result of closing the throttle progressively, the outer end of the servo cylinder will automatically be subjected to a correspondingly higher proportion of the delivery pressure of the pump and thereby adjust the transmission speed ratio to suit the part throttle performance of the engine.

The pump 1 and motor 3 which are of the flooded type are connected to the reservoir 8 through a passage 18 to admit leakage being returned to the reservoir.

Having thus described my invention what I claim as new and desire to secure by Letters Patent is:

For use in a vehicle having an engine provided with a control throttle which is movable by an actuating member, a transmission system comprising in combination a swash-plate pump which is drivable by the engine, and is provided with an angularly adjustable cam plate, and with a fluid inlet and a fluid outlet, a fluid-operable motor provided with a fluid inlet and a fluid outlet, a servo-cylinder having one end in communication with the inlet of said pump, a piston which is slidably accommodated in said servo-cylinder, and which is connected to said cam plate so that the position of the latter is variable by movement of said piston, a spring contained in the last mentioned end of said servo-cylinder, and acting on said piston for enabling said cam plate to be moved by said piston into a maximum oblique position relative to the other parts of said pump, a pair of passages through which the inlet and outlet of said pump are connected respectively to the outlet and inlet of said motor, a third passage which interconnects the inlet and outlet of said pump, and which incorporates a pair of restrictions spaced from, and in series with, each other, means connecting said third passage, at a position between said restrictions, to the end of said servo-cylinder remote from said spring for enabling movement of said piston by said spring to be opposed by the pressure of fluid supplied to the last mentioned end of said servo-cylinder from said pump through said third passage and one of the restrictions therein, which pressure is proportional to the delivery pressure of said pump, and a valve which bridges the last mentioned restriction in said third passage, and which is operable by the throttle-actuating member of the engine so that closing movement of the engine throttle is accompanied by opening movement of said valve which, when opened, enables the pressure of the fluid in the end of said servo-cylinder remote from said spring to be increased, in proportion to the delivery pressure of said pump, for moving said piston against the action of said spring.

References Cited in the file of this patent

UNITED STATES PATENTS

| | | |
|---|---|---|
| 2,774,436 | Ferris | Dec. 18, 1956 |
| 2,886,944 | Horwood | May 19, 1959 |
| 2,896,411 | Bowers et al. | July 28, 1959 |
| 2,941,365 | Carlson et al. | June 21, 1960 |
| 2,956,406 | Peaster | Oct. 18, 1960 |